United States Patent
Setogawa et al.

(10) Patent No.: US 11,270,814 B2
(45) Date of Patent: Mar. 8, 2022

(54) INSULATED WIRE AND CABLE USING HALOGEN-FREE FLAME-RETARDANT RESIN COMPOSITION

(71) Applicant: Hitachi Metals, Ltd., Tokyo (JP)

(72) Inventors: Akira Setogawa, Tokyo (JP); Makoto Iwasaki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 271 days.

(21) Appl. No.: 15/824,437

(22) Filed: Nov. 28, 2017

(65) Prior Publication Data
US 2018/0158571 A1    Jun. 7, 2018

(30) Foreign Application Priority Data

Dec. 2, 2016 (JP) .............................. JP2016-235143
Jun. 28, 2017 (JP) .............................. JP2017-126088

(51) Int. Cl.
*H01B 7/295* (2006.01)
*C08L 23/08* (2006.01)
(Continued)

(52) U.S. Cl.
CPC .............. *H01B 7/295* (2013.01); *C08L 23/06* (2013.01); *C08L 23/0815* (2013.01);
(Continued)

(58) Field of Classification Search
CPC .......... H01B 7/295; H01B 7/292; H01B 3/44; H01B 3/446; H01B 3/444; H01B 3/441;
(Continued)

(56) References Cited

U.S. PATENT DOCUMENTS 4,216,101 A * 8/1980 Davis ....................... C08K 5/23
                                                                  252/581
4,791,160 A    12/1988 Kato et al.
(Continued)

FOREIGN PATENT DOCUMENTS

JP    2012-087238 A    5/2012
JP    2014-065809 A    4/2014
(Continued)

OTHER PUBLICATIONS

Rogers, T. (Sep. 14, 2015). Everything You Need to Know About Polyethylene (PE). Accessed on Apr. 27, 2020, from https://www.creativemechanisms.com/blog/polyethylene-pe-for-prototypes-3d-printing-and-cnc (Year: 2015).*

(Continued)

*Primary Examiner* — Jeremy R Pierce
*Assistant Examiner* — Christine X Nisula
(74) *Attorney, Agent, or Firm* — Roberts Calderon Safran & Cole P.C.

(57) ABSTRACT

An insulated wire includes a conductor, and an insulation layer covering an outer periphery of the conductor. The insulation layer includes a halogen-free flame-retardant resin composition including a base polymer, not less than 1 part by mass and not more than 10 parts by mass of an amorphous silica and not less than 10 parts by mass and not more than 150 parts by mass of a halogen-free flame retardant relative to 100 parts by mass of the base polymer. The base polymer includes not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

10 Claims, 1 Drawing Sheet

(51) Int. Cl.
*C08L 23/06* (2006.01)
*H01B 3/44* (2006.01)

(52) U.S. Cl.
CPC .......... *C08L 23/0853* (2013.01); *H01B 3/441* (2013.01); *H01B 3/446* (2013.01); *C08L 2201/02* (2013.01); *C08L 2201/22* (2013.01); *C08L 2203/202* (2013.01); *C08L 2205/02* (2013.01); *C08L 2207/066* (2013.01)

(58) Field of Classification Search
CPC ......... H01B 7/29; H01B 3/30; C08L 2201/02; C08L 2203/206; C08L 2203/202; C08L 23/0853; C08L 23/04; C08L 23/06; C08L 23/0815; C08L 2207/066; C08L 2205/02; C08L 2201/22; C08L 2201/202; C08L 12/06; C08L 2555/54; C09D 123/06; C09D 123/0815
USPC ......................................................... 428/394
See application file for complete search history.

(56) References Cited

U.S. PATENT DOCUMENTS

| 2002/0193533 | A1* | 12/2002 | Kamo | B29C 48/40 |
| | | | | 525/397 |
| 2003/0150838 | A1* | 8/2003 | Lortz | C09K 3/1463 |
| | | | | 216/89 |
| 2009/0114417 | A1* | 5/2009 | Nakayama | H01B 3/447 |
| | | | | 174/110 SR |
| 2011/0166279 | A1* | 7/2011 | Basfar | H01B 7/295 |
| | | | | 524/404 |
| 2012/0003473 | A1* | 1/2012 | Segawa | C08L 23/0853 |
| | | | | 428/389 |
| 2013/0287980 | A1* | 10/2013 | Burdzy | C09K 3/10 |
| | | | | 428/35.7 |
| 2014/0018481 | A1* | 1/2014 | Basfar | C08K 3/22 |
| | | | | 524/291 |
| 2014/0141240 | A1* | 5/2014 | Segawa | H01B 3/30 |
| | | | | 428/375 |
| 2014/0367144 | A1 | 12/2014 | Segawa et al. | |
| 2015/0017441 | A1* | 1/2015 | Yaguchi | C08L 23/06 |
| | | | | 428/383 |
| 2015/0294755 | A1* | 10/2015 | Zhou | C09D 123/06 |
| | | | | 428/379 |
| 2019/0348191 | A1* | 11/2019 | Hagstrand | B29C 48/022 |

FOREIGN PATENT DOCUMENTS

| JP | 2015-913 A | 1/2015 |
| JP | 2016-037516 A | 3/2016 |

OTHER PUBLICATIONS

Office Action issued in the corresponding JP Patent Application No. 2017-126088 dated Nov. 12, 2020.

Office Action issued in the corresponding TW Patent Application No. 106140592 dated Jan. 28, 2021.

Office Action issued in corresponding Korean Patent Application No. 10-2017-0153534 dated Jan. 6, 2022.

* cited by examiner

INSULATED WIRE AND CABLE USING HALOGEN-FREE FLAME-RETARDANT RESIN COMPOSITION

The present application is based on Japanese patent application Nos. 2016-235143 and 2017-126088 filed on Dec. 2, 2016 and Jun. 28, 2017, respectively, the entire contents of which are incorporated herein by reference.

BACKGROUND OF THE INVENTION

1. Field of the Invention

The invention relates to an insulated wire and a cable that use a halogen-free flame-retardant resin composition.

2. Description of the Related Art

In recent years, halogen-free flame-retardant wires and cables formed without using polyvinyl chloride or halogen-based flame retardants have spread rapidly as so-called eco-friendly wires/cables. For such halogen-free flame-retardant wires and cables, a resin composition obtained by mixing a large amount of halogen-free flame retardant such as magnesium hydroxide with a polyolefin resin is generally used as a wire insulation to obtain high flame retardancy which allows prevention of fire propagation in the event of fire (see, e.g., JP 2016/037516 A). However, the halogen-free flame retardant when added in a large amount causes a problem of a decrease in mechanical strength.

When processing or laying electric wires or cables in various industrial fields, it is necessary to remove coverings at ends of the electric wires and cables. Particularly in industries requiring harnessing of wires and cables, such as automobile or electronics industries, high-speed automatic processing systems dedicated for processing cable/wire end, which are equipment for mass production, are often used. Also, stripping tools (hand wire strippers) are sometimes used when manually wiring, e.g., when connecting electric wires/cables to press-fit connectors, etc., inside distribution boards.

SUMMARY OF THE INVENTION

If uncut portions or stripped debris are left after removing the coverings from the ends of the electric wires and cables, the insulation may be caught between the connector and the conductor and may cause the defective conduction. Therefore, electric wires and cables need to have such properties that the insulation is easily separated from the conductor, the insulation does not stretch or crack on the end face and stripped debris are not left on the conductor, i.e., the end workability is required.

In view of this, only use of the resin composition obtained by mixing a halogen-free flame retardant such as magnesium hydroxide with a polyolefin resin is not good enough to obtain the end workability and there is a room for improvement.

It is an object of the invention to provide an insulated wire and a cable using a halogen-free flame-retardant resin composition that are excellent in mechanical strength and end workability.

It is another object of the invention to provide an insulated wire and a cable using a halogen-free flame-retardant resin composition that are excellent in mechanical strength, end workability and white discoloration resistance.

According to an embodiment of the invention, an insulated wire and a cable using a halogen-free flame-retardant resin composition defined by [1] to [6] below are provided.

[1] An insulated wire, comprising:
 a conductor; and
 an insulation layer covering an outer periphery of the conductor,
 wherein the insulation layer comprises a halogen-free flame-retardant resin composition comprising a base polymer, not less than 1 part by mass and not more than 10 parts by mass of an amorphous silica and not less than 10 parts by mass and not more than 150 parts by mass of a halogen-free flame retardant relative to 100 parts by mass of the base polymer, and
 wherein the base polymer comprises not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

[2] The insulated wire according to [1], wherein the halogen-free flame-retardant resin composition further comprises not less than 1 part by mass and not more than 40 parts by mass of carbon black relative to 100 parts by mass of the base polymer.

[3] A cable, comprising:
 an insulated wire comprising a conductor and an insulation layer covering an outer periphery of the conductor; and
 a sheath formed around the insulated wire,
 wherein the sheath comprises a sheath halogen-free flame-retardant resin composition comprising a sheath base polymer, not less than 1 part by mass and not more than 10 parts by mass of an amorphous silica and not less than 10 parts by mass and not more than 150 parts by mass of a halogen-free flame retardant relative to 100 parts by mass of the sheath base polymer, and
 wherein the sheath base polymer comprises not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

[4] The cable according to [3], wherein the insulation layer comprises an insulation layer halogen-free flame-retardant resin composition comprises an insulation layer base polymer, not less than 1 part by mass and not more than 10 parts by mass of an amorphous silica and not less than 10 parts by mass and not more than 150 parts by mass of a halogen-free flame retardant relative to 100 parts by mass of the insulation layer base polymer, and
wherein the insulation layer base polymer comprises not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

[5] The cable according to [3], wherein the sheath halogen-free flame-retardant resin composition further comprises not less than 1 part by mass and not more than 40 parts by mass of carbon black relative to 100 parts by mass of the sheath base polymer.

[6] The cable according to [4], wherein the insulation layer halogen-free flame-retardant resin composition further comprises not less than 1 part by mass and not more than 40 parts by mass of carbon black relative to 100 parts by mass of the insulation layer base polymer.

Effects of the Invention

According to an embodiment of the invention, an insulated wire and a cable can be provided that use a halogen-free flame-retardant resin composition and are excellent in mechanical strength and end workability.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment of the Invention

Figure 1:
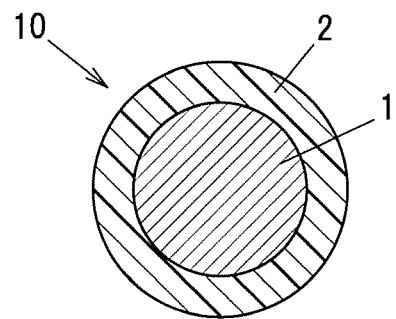
FIG. 1 is a cross sectional view showing an insulated wire in an embodiment of the present invention.

An embodiment of the invention will be described below. Hereinafter, the numerical range expressed using "-" includes the numerical values before and after "-" as the lower and upper limits.

Halogen-Free Flame-Retardant Resin Composition

A halogen-free resin composition used in the embodiment of the invention contains a base polymer and not less than 1 part by mass and not more than 10 parts by mass of an amorphous silica relative to 100 parts by mass of the base polymer. The base polymer contains not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

Base Polymer

The base polymer of the halogen-free resin composition used in the embodiment of the invention contains not less than 50 parts by mass and not more than 90 parts by mass of either an ethylene-vinyl acetate copolymer or an ethylene-butene copolymer and not less than 10 parts by mass and not more than 50 parts by mass of a low-density polyethylene.

Mechanical strength is not sufficient when the content of the low-density polyethylene is less than 10 parts by mass, while flexibility of electric wire or cable is low when the content is more than 50 parts by mass. Use of the ethylene-vinyl acetate copolymer is particularly preferable since endothermic reaction caused by deacetylation when burnt exerts a significant flame-retardant effect.

For the halogen-free resin composition used in the embodiment of the invention, it is preferable to use a low-density polyethylene with a melting temperature of not less than 95° C. and not more than 125° C. It is because flexibility of electric wire or cable is low when the melting temperature of the low-density polyethylene is less than 95° C. and also when the melting temperature of the low-density polyethylene is more than 125° C. The melting temperature here is a temperature at which a peak appears in a relation between temperature and the amount of heat as measured using a differential scanning calorimeter (DCS) in the temperature range of −50° C.-200° C. at a temperature increase rate of 10° C./min.

Amorphous Silica

The halogen-free resin composition used in the embodiment of the invention contains an amorphous silica. It is because the amorphous silica is effective to obtain end workability of electric wire and cable. The content of the amorphous silica is not less than 1 part by mass and not more than 10 parts by mass, more preferably not less than 3 parts by mass and not more than 7 parts by mass, relative to 100 parts by mass of the base polymer. It is because it is not effective enough to obtain end workability when the content of the amorphous silica is less than 1 part by mass and also when more than 10 parts by mass.

It is preferable to use an amorphous silica with a specific surface area of not less than 50 $m^2/g$ and less than 200 $m^2/g$, more preferably not less than 100 $m^2/g$ and not more than 150 $m^2/g$, as measured by the BET method.

Halogen-Free Flame Retardant

The halogen-free resin composition used in the embodiment of the invention contains a halogen-free flame retardant. It is possible to use, e.g., a metal hydroxide of which examples include magnesium hydroxide ($Mg(OH)_2$), aluminum hydroxide ($Al(OH)_3$), hydrotalcite, calcium aluminate hydrate, calcium hydroxide, barium hydroxide and hard clay, etc. These metal hydroxides are decomposed and dehydrated when the electric wire or cable is heated, and the released water lowers the temperature of the insulation and suppresses combustion of the insulation.

These flame retardants can be used alone or in a combination of two or more. Among these flame retardants, it is preferable to use at least one of magnesium hydroxide and aluminum hydroxide. It is because magnesium hydroxide and aluminum hydroxide absorb not less than 1500 J/g and not more than 1600 J/g of heat during decomposition, which is higher than heat absorbed by calcium hydroxide (1000 J/g).

The halogen-free flame retardant is preferably surface-treated with, e.g., a silane coupling agent, a titanate-based coupling agent, fatty acid such as stearic acid, fatty acid salt such as stearate, or fatty acid metal such as calcium stearate to control mechanical strength (a balance between tensile strength and elongation) of the insulation.

The halogen-free resin composition used in the embodiment of the invention contains not less than 10 parts by mass and not more than 150 parts by mass of the halogen-free flame retardant relative to 100 parts by mass of the base polymer. It is because flame retardancy is not sufficient when less than 10 parts by mass, while mechanical strength (tensile strength and elongation) significantly decreases when more than 150 parts by mass. The more preferable amount of the halogen-free flame retardant to be added is not less than 60 parts by mass and not more than 150 parts by mass in view of flame retardancy, and is not less than 10 parts by mass and not more than 90 parts by mass in view of tensile strength.

The halogen-free resin composition used in the embodiment of the invention may also contain carbon black. The amount of carbon black to be added is preferably not less than 1 part by mass and not more than 40 parts by mass relative to 100 parts by mass of the base polymer. It is because white discoloration resistance decreases when the added amount of carbon black is less than 1 part by mass and also when more than 40 parts by mass.

Particularly in industries requiring harnessing of wires and cables, such as automobile or electronics industries, electric wires or cables are often rubbed when being processed or laid. Electric wires or cables are often rubbed and become white also when manually wired, e.g., when connected to press-fit connectors, etc., inside distribution boards. In such use, addition of carbon black is effective.

Cross-Linking Agent

The halogen-free resin composition used in the embodiment of the invention may also contain a cross-linking agent. As the cross-linking agent, it is possible to use, e.g., an organic peroxide. Examples of the organic peroxide include hydroperoxide, diacyl peroxide, peroxyester, dialkyl peroxide, ketone peroxide, peroxyketal, peroxydicarbonate and peroxymonocarbonate, etc. The content of the cross-linking agent is preferably not less than 0.1 parts by mass and not more than 5 parts by mass relative to 100 parts by mass of the base polymer.

Cross-Linking Aid

The halogen-free resin composition used in the embodiment of the invention may also contain a cross-linking aid. The cross-linking aid used here is desirably, e.g., trimethylolpropane trimethacrylate (TMPT) or triallyl isocyanurate (TAIC (registered trademark)).

Lubricant

The halogen-free resin composition used in the embodiment of the invention may also contain a lubricant. The lubricant can be, e.g., fatty acid, fatty acid metal salt or fatty acid amide, etc., and a specific example is zinc stearate, etc. These lubricants can be used alone or as a mixture of two or more.

Colorant

The halogen-free resin composition used in the embodiment of the invention may also contain a colorant. As the colorant, it is possible to use, e.g., a color masterbatch for halogen-free material, etc.

To the halogen-free resin composition used in the embodiment of the invention, it is possible, if necessary, to add various additives such as inorganic filler, stabilizer, antioxidant, plasticizer, compatibilizing agent and stabilizer, in addition to the components described above. In addition, cross-linking is not limited to organic peroxide cross-linking and may be performed by radiation of electron beam, etc.

Insulated Wire

FIG. 1 is a cross sectional view showing an insulated wire in the embodiment of the invention.

As shown in FIG. 1, an insulated wire 10 in the embodiment of the invention has a conductor 1 and an insulation layer 2 covering the outer periphery of the conductor 1.

The insulation layer 2 is formed of the halogen-free resin composition used in the embodiment of the invention.

Meanwhile, as the conductor 1, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands.

The halogen-free flame-retardant resin composition used in the embodiment of the invention is applicable not only to the insulated wires in Examples but also to any sizes of insulated wires, and can be used to form insulations of halogen-free wires for wiring in panel, for vehicle, for automobile, for wiring in device and for power transmission.

Cable

Figure 2:
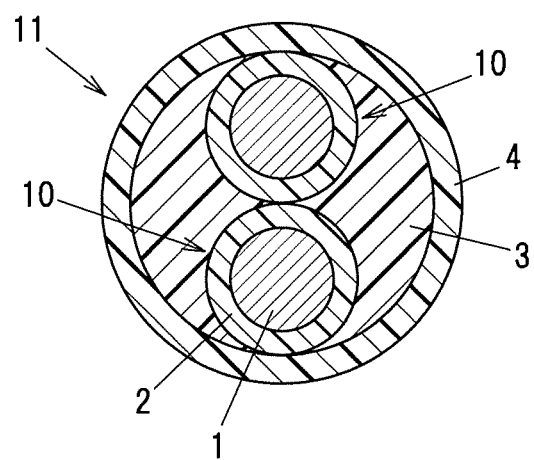
FIG. 2 is a cross sectional view showing a cable in the embodiment of the invention.

FIG. 2 is a cross sectional view showing a cable in the embodiment of the invention.

As shown in FIG. 2, a cable 11 in the embodiment of the invention is provided with a two-core twisted wire formed by twisting two insulated wires 10 in the present embodiment and a sheath 4 covering the two-core twisted wire with a filler 3 interposed therebetween. The insulated wire may be a single-core wire or a multi-core twisted wire other than two-core. Another insulation layer may be additionally formed between the insulated wires 10 and the sheath 4 so that the cable has a multilayer sheath structure composed of the sheath 4 and another sheath.

The sheath 4 is formed of the halogen-free flame-retardant resin composition used in the embodiment of the invention.

Although the example of using the insulated wires 10 in the present embodiment is described here, it is possible to use insulated wires formed using general materials.

EXAMPLES

Preparation of the Halogen-Free Resin Composition

Firstly, components listed in Examples 1 to 24 and Comparative Examples 1 to 8 of Tables below were mixed. Then, each mixture was kneaded by a 25L kneader at a starting temperature of 50° C. After kneading until the temperature reached 150° C. due to self-heating, each mixture was pelletized. Halogen-free resin compositions in Examples and Comparative Examples were thereby prepared.

Making of the Insulated Wire

Next, insulated wires were made using the prepared halogen-free resin compositions. The halogen-free resin compositions were extruded on conductors using a 4.5-inch continuous vapor cross-linking extruder. At this time, the resin compositions were extruded on 2.3 mm-diameter tin-plated copper stranded conductors at a cylinder temperature of 100° C., and were then cross-linked by exposure to steam of 13 kg/cm$^2$, thereby obtaining the wires in Examples and Comparative Examples.

The insulated wires obtained as described above were evaluated. Tubular insulation layers obtained by, e.g., pulling out the conductors from the insulated wires were used to evaluate mechanical strength (tensile strength, elongation), flexibility (modulus at 100%), flame retardancy (JIS Inclined flame test) and end workability. Sheet-shaped insulation layers were used to evaluate volume resistivity.

The specific methods are as follows.

In accordance with JIS C 3005 "4.16 Tensile properties of insulation and sheath", mechanical strength (tensile strength, elongation) and flexibility (modulus at 100%) of the tubular insulation layers obtained by pulling out the conductors from the insulated wires were measured at a tensile rate of 200 mm/min. The average of five points was used to evaluate. The result of tensile strength was judged as "◯ (acceptable)" when not less than 10 MPa and "x (not acceptable)" when less than 10 MPa, the result of elongation was judged as "◯" when not less than 400% and "x" when less than 400%, and the result of modulus at 100% was judged as "◯" when not more than 6 MPa and "x" when more than 6 MPa. This evaluation method was adopted since insulation layers having a tensile strength of less than 10 MPa or an elongation of less than 400% do not have sufficient mechanical strength, and insulation layers having a modulus of more than 6 MPa at 100% are hard and have insufficient flexibility.

For the evaluation of insulation properties (volume resistivity), the prepared halogen-free resin compositions were cross-linked by pressing at 180° C. for 1 minute to make 1 mm-thick sheets, and insulation properties (volume resistivity) of the sheets were measured at 500V for 1 minutes in accordance with JIS K 6271 "6. Double ring electrode method". The result was judged as "◯" when not less than $1 \times 10^{14}$ Ω·cm and "x" when less than $1 \times 10^{14}$ Ω·cm. Insulation properties are insufficient when the volume resistivity is less than $1 \times 10^{14}$ Ω·cm.

For the evaluation of flame retardancy (JIS Inclined flame test), the JIS Inclined flame test was conducted in accordance with JIS C 3005, 4.26 flame retardancy, b) Inclined test. Halogen-free flame-retardant insulated wires each using thirty-seven 0.26 mm-diameter strands and having a conductor cross sectional area of 2 mm$^2$ and a wire outer diameter of about 4 mm were prepared as samples and were held at an inclination of about 60° relative to the horizontal plane. Then, the top of a reducing flame was applied to the samples at a position about 20 cm from the lower end within 30 seconds until the samples ignited. After slowly removing the flame, time (seconds) to extinguishment was measured. The samples naturally extinguished within 60 seconds were judged as "○", and the samples not extinguished within 60 seconds were judged as "x". Obtaining the evaluation result of "○" was set to as a target For the evaluation of end workability, the insulation layers were removed (stripped) from the conductors by a stripper. The result was judged as "○" when the insulation layer did not stretch or crack in visual check and no stripped debris was left on the conductor, and the result was judged as "x" when the insulation layer stretched or cracked or any stripped debris was left on the conductor.

White discoloration resistance was evaluated in accordance with EN 50305 which is a standard for thin wall and light weight electric wires. The insulation layers were abraded by a 0.45 mm-diameter steel blade while applying a load of 9N to the horizontally-placed wire samples, and the outer appearance was visually checked. The samples without white discoloration were regarded as "○", and the samples turned white were regarded as "x".

The evaluation results are shown in the lower columns of Table 1. The samples in Examples 1 to 11 achieved the above-mentioned targets of mechanical strength (tensile strength, elongation), flexibility (modulus at 100%), insulation properties (volume resistivity), flame retardancy (JIS Inclined flame test) and end workability, and the samples in Comparative Examples 1 to 8 did not achieve at least one of the targets.

In Examples 12 to 24, white discoloration resistance was also evaluated, in addition to the evaluations of mechanical strength (tensile strength, elongation), flexibility (modulus at 100%), flame retardancy (JIS Inclined flame test) and end workability.

TABLE 1

(Unit: parts by mass)

| | | Items | Examples 1 | 2 | 3 | 4 | 5 | 6 | 7 | 8 | 9 | 10 | 11 |
|---|---|---|---|---|---|---|---|---|---|---|---|---|---|
| Proportion | Halogen-free resin | Ethylene-vinyl acetate copolymer (melting temperature: 72° C.) | 90 | 70 | 50 | | | 70 | 70 | 70 | 70 | 70 | 70 |
| | | Ethylene-butene copolymer (melting temperature: 66° C.) | | | | 90 | 50 | | | | | | |
| | | Polyethylene (melting temperature: 101° C.) | 10 | 30 | 50 | 10 | 50 | 30 | 30 | 30 | 30 | 30 | 30 |
| | Filler particle | Amorphous silica particle 1 (specific surface area as measured by the BET method: 110 m²/g) | 5 | 5 | 5 | 5 | 5 | 1 | 8 | 1 | 8 | 5 | 5 |
| | Halogen-free flame retardant | Magnesium hydroxide 1 | 80 | 80 | 80 | 80 | 80 | 10 | 150 | 10 | 150 | | |
| | | Magnesium hydroxide 2 | | | | | | | | | | 80 | |
| | | Aluminum hydroxide 1 | | | | | | | | | | | 80 |
| | Cross-linking agent | Organic peroxide | 2 | 2 | 2 | 2 | 2 | 2 | 2 | 2 | 2 | 2 | 2 |
| | Crosslinking aid | Multifunctional methacrylate | 3 | 3 | 3 | 3 | 3 | 3 | 3 | 3 | 3 | 3 | 3 |
| | Antioxidant | Antioxidant 1 | 2 | 2 | 2 | 2 | 2 | 2 | 2 | 2 | 2 | 2 | 2 |
| | | Antioxidant 2 | 4 | 4 | 4 | 4 | 4 | 4 | 4 | 4 | 4 | 4 | 4 |
| | Colorant | Carbon black | 10 | 10 | 10 | 10 | 10 | 10 | 10 | 10 | 10 | 10 | 10 |
| | Lubricant | Zinc stearate | 1 | 1 | 1 | 1 | 1 | 1 | 1 | 1 | 1 | 1 | 1 |
| Evaluation | Mechanical strength | Tensile strength (MPa): Target - not less than 10 | ○ | ○ | ○ | ○ | ○ | ○ | ○ | ○ | ○ | ○ | ○ |
| | | Elongation (%): Target - not less than 400 | ○ | ○ | ○ | ○ | ○ | ○ | ○ | ○ | ○ | ○ | ○ |
| | Flexibility | Modulus at 100% (MPa): Target - not more than 6 | ○ | ○ | ○ | ○ | ○ | ○ | ○ | ○ | ○ | ○ | ○ |
| | Insulation properties | Volume resistivity (Ωcm): Target - not less than 1 × 10¹⁴ | ○ | ○ | ○ | ○ | ○ | ○ | ○ | ○ | ○ | ○ | ○ |
| | Flame retardancy | (JIS Inclined flame test): Target - "○" | ○ | ○ | ○ | ○ | ○ | ○ | ○ | ○ | ○ | ○ | ○ |
| | Processability | End workability: Target - "○" | ○ | ○ | ○ | ○ | ○ | ○ | ○ | ○ | ○ | ○ | ○ |

TABLE 2

(Unit: parts by mass)

| | | Items | Examples 12 | 13 | 14 | 15 | 16 | 17 | 18 | 19 | 20 | 21 | 22 | 23 | 24 |
|---|---|---|---|---|---|---|---|---|---|---|---|---|---|---|---|
| Proportion | Halogen-free resin | Ethylene-vinyl acetate copolymer (melting temperature: 72° C.) | 90 | 70 | 50 | | | 70 | 70 | 70 | 70 | 70 | 70 | 90 | 50 |
| | | Ethylene-butene copolymer (melting temperature: 66° C.) | | | | 90 | 50 | | | | | | | | |
| | | Polyethylene (melting temperature: 101° C.) | 10 | 30 | 50 | 10 | 50 | 30 | 30 | 30 | 30 | 30 | 30 | 10 | 50 |
| | Filler particle | Amorphous silica particle 1 (specific surface area as measured by the BET method: 110 m²/g) | 5 | 5 | 5 | 5 | 5 | 1 | 10 | 1 | 10 | 5 | 5 | 5 | 5 |
| | Halogen-free flame retardant | Magnesium hydroxide 1 | 80 | 80 | 80 | 80 | 80 | 10 | 150 | 10 | 150 | | | 80 | 80 |
| | | Magnesium hydroxide 2 | | | | | | | | | | 80 | | | |
| | | Aluminum hydroxide 1 | | | | | | | | | | | 80 | | |
| | Cross-linking agent | Organic peroxide | 2 | 2 | 2 | 2 | 2 | 2 | 2 | 2 | 2 | 2 | 2 | 2 | 2 |

TABLE 2-continued (Unit: parts by mass)

| | Items | | Examples 12 | 13 | 14 | 15 | 16 | 17 | 18 | 19 | 20 | 21 | 22 | 23 | 24 |
|---|---|---|---|---|---|---|---|---|---|---|---|---|---|---|---|
| | Crosslinking aid | Multifunctional methacrylate | 3 | 3 | 3 | 3 | 3 | 3 | 3 | 3 | 3 | 3 | 3 | 3 | 3 |
| | Antioxidant | Antioxidant 1 | 2 | 2 | 2 | 2 | 2 | 2 | 2 | 2 | 2 | 2 | 2 | 2 | 2 |
| | | Antioxidant 2 | 4 | 4 | 4 | 4 | 4 | 4 | 4 | 4 | 4 | 4 | 4 | 4 | 4 |
| | Colorant | Carbon black | 10 | 10 | 10 | 10 | 10 | 10 | 10 | 10 | 10 | 10 | 10 | 10 | 10 |
| | Lubricant | Zinc stearate | 1 | 1 | 1 | 1 | 1 | 1 | 1 | 1 | 1 | 1 | 1 | 1 | 1 |
| Evaluation | Mechanical strength | Tensile strength (MPa): Target - not less than 10 | ○ | ○ | ○ | ○ | ○ | ○ | ○ | ○ | ○ | ○ | ○ | ○ | ○ |
| | | Elongation (%): Target - not less than 400 | ○ | ○ | ○ | ○ | ○ | ○ | ○ | ○ | ○ | ○ | ○ | ○ | ○ |
| | Flexibility | Modulus at 100% (MPa): Target - not more than 6 | ○ | ○ | ○ | ○ | ○ | ○ | ○ | ○ | ○ | ○ | ○ | ○ | ○ |
| | Flame retardancy | (JIS Inclined flame test): Target - "○" | ○ | ○ | ○ | ○ | ○ | ○ | ○ | ○ | ○ | ○ | ○ | ○ | ○ |
| | Processability | End workability: Target - "○" | ○ | ○ | ○ | ○ | ○ | ○ | ○ | ○ | ○ | ○ | ○ | ○ | ○ |
| | White discoloration resistance | Target - "○" | ○ | ○ | ○ | ○ | ○ | ○ | ○ | ○ | ○ | ○ | ○ | ○ | ○ |

TABLE 3

(Unit: parts by mass)

| | Items | | Comparative Examples 1 | 2 | 3 | 4 | 5 | 6 | 7 | 8 |
|---|---|---|---|---|---|---|---|---|---|---|
| Proportion | Halogen-free resin | Ethylene-vinyl acetate copolymer (melting temperature: 72° C.) | 97 | 40 | | | 70 | 70 | 70 | 70 |
| | | Ethylene-butene copolymer (melting temperature: 66° C.) | | | 97 | 40 | | | | |
| | | Polyethylene (melting temperature: 101° C.) | 3 | 60 | 3 | 60 | 30 | 30 | 30 | 30 |
| | Filler particle | Amorphous silica particle 1 (specific surface area as measured by the BET method: 110 m²/g) | 5 | 5 | 5 | 5 | | 15 | 5 | 5 |
| | Halogen-free flame retardant | Magnesium hydroxide 1 | 80 | 80 | 80 | 80 | 80 | 80 | 5 | 160 |
| | | Magnesium hydroxide 2 | | | | | | | | |
| | | Aluminum hydroxide 1 | | | | | | | | |
| | Cross-linking agent | Organic peroxide | 2 | 2 | 2 | 2 | 2 | 2 | 2 | 2 |
| | Crosslinking aid | Multifunctional methacrylate | 3 | 3 | 3 | 3 | 3 | 3 | 3 | 3 |
| | Antioxidant | Antioxidant 1 | 2 | 2 | 2 | 2 | 2 | 2 | 2 | 2 |
| | | Antioxidant 2 | 4 | 4 | 4 | 4 | 4 | 4 | 4 | 4 |
| | Colorant | Carbon black | 10 | 10 | 10 | 10 | 10 | 10 | 10 | 10 |
| | Lubricant | Zinc stearate | 1 | 1 | 1 | 1 | 1 | 1 | 1 | 1 |
| Evaluation | Mechanical strength | Tensile strength (MPa): Target - not less than 10 | x | ○ | x | ○ | ○ | ○ | ○ | x |
| | | Elongation (%): Target - not less than 400 | ○ | x | ○ | x | ○ | ○ | ○ | x |
| | Flexibility | Modulus at 100% (MPa): Target - not more than 6 | ○ | x | ○ | x | ○ | ○ | ○ | ○ |
| | Insulation properties | Volume resistivity (Ωcm): Target - not less than $1 \times 10^{14}$ | ○ | ○ | ○ | ○ | ○ | ○ | ○ | ○ |
| | Flame retardancy | (JIS Inclined flame test): Target - "○" | ○ | ○ | ○ | ○ | ○ | ○ | x | ○ |
| | Processability | End workability: Target - "○" | ○ | ○ | ○ | ○ | x | x | ○ | ○ |

Ethylene-Vinyl Acetate Copolymer

Ethylene-vinyl acetate copolymer: (Product name) Evaflex EV260, manufactured by Du Pont-Mitsui Polychemical (Melt Mass-Flow Rate (JIS K7210:1999): 6 g/10 min (190° C., 2.16 kg), vinyl acetate content (JIS K7192:1999): 28 mass %, melting point 72° C.)

Ethylene-Butene Copolymer

Ethylene-butene copolymer: (Product name) TAFMER DF-810, manufactured by Mitsui Chemicals (Melt Mass-Flow Rate (JIS K7210:1999): 1.2 g/10 min (190° C., 2.16 kg), melting point 66° C.)

Polyethylene

Low-density polyethylene: (Product name) Excellen GMH GH030, manufactured by Sumitomo Chemical (MFR (JIS K6922-1): 0.5 g/10 min, melting point 101° C.)

Amorphous Silica Particle 1

Amorphous silica particle: (Product name) Aerosil R972, manufactured by Nippon Aerosil (specific surface area as measured by the BET method: 110 m²/g)

Magnesium Hydroxide 1

Fatty acid-treated magnesium hydroxide: (Product name) Magseeds N4, manufactured by Konoshima Chemical Magnesium Hydroxide 2

Silane-treated magnesium hydroxide: (Product name) Magseeds S4, manufactured by Konoshima Chemical Aluminum Hydroxide 1

Fatty acid-treated aluminum hydroxide: (Product name) BF013S, manufactured by Nippon Light Metal Cross-Linking Agent Organic peroxide: (Product name) Perbutyl P, manufactured by NOF Corporation Crosslinking Aid Multifunctional methacrylate: (Product name) TMPT, manufactured by Shin-Nakamura Chemical Antioxidant
  Antioxidant 1: (Product name) Nocrac 224, manufactured by Ouchi Shinko Chemical Industrial
  Antioxidant 2: (Product name) Antage MB, manufactured by Kawaguchi Chemical Industry
Colorant
  Carbon black: (Product name) Asahi Thermal, manufactured by Asahi Carbon Lubricant
  Zinc stearate: (Product name) Zinc stearate, manufactured by KISCO Ltd.

As shown in Tables 1 and 2, the samples of Examples 1 to 11 and 12 to 24 were satisfactory in all the evaluations of mechanical strength (tensile strength, elongation), flexibility (modulus at 100%), volume resistivity, flame retardancy (JIS Inclined flame test) and end workability. The samples in Examples 12 to 24 were also satisfactory in the evaluation of white discoloration resistance.

On the other hand, in Comparative Examples 1 and 3 in which the content of the low-density polyethylene was out of the range defined in the invention, tensile strength was lower than Examples, as shown in Table 3.

In Comparative Examples 2 and 4 in which the content of the low-density polyethylene was out of the range defined in the invention, elongation and modulus at 100% were lower than Examples.

In Comparative Examples 5 and 6 in which the content of the amorphous silica was out of the range defined in the invention, end workability was poorer than Examples.

In Comparative Example 7 in which the content of the halogen-free flame retardant was out of the range defined in the invention, flame retardancy was lower than Examples.

In Comparative Example 8 in which the content of the halogen-free flame retardant was out of the range defined in the invention, tensile strength and elongation were lower than Examples.

As described above, Examples 1 to 11 and 12 to 24 were "o" for all evaluations.

Although the invention has been described in reference to the embodiment and Examples, the invention is not intended to be limited thereto and various kinds of changes, modifications and combinations, etc., can be made.

What is claimed is:

1. An insulated wire, comprising:
   a conductor; and
   an insulation layer covering an outer periphery of the conductor,
   wherein the insulation layer comprises a halogen-free flame-retardant resin composition comprising a base polymer, not less than 1 part by mass and not more than 10 parts by mass of an amorphous silica with a specific surface area of not less than 100 m$^2$/g and not more than 150 m$^2$/g, as measured by BET method and not less than 10 parts by mass and not more than 80 parts by mass of a metal hydroxide as a flame retardant component relative to 100 parts by mass of the base polymer, and
   wherein the base polymer consists of not less than 50 parts by mass and not more than 90 parts by mass of an ethylene-butene copolymer and not less than 10 parts by mass and not more than 50 parts by mass of a low-density polyethylene,
   wherein the flame retardant component consists of the metal hydroxide, and
   a melting temperature of the low-density polyethylene is not less than 95° C. and not more than 101° C.

2. The insulated wire according to claim 1,
   wherein the halogen-free flame-retardant resin composition further comprises not less than 1 part by mass and not more than 40 parts by mass of carbon black relative to 100 parts by mass of the base polymer.

3. The insulated wire according to claim 1,
   wherein a content of the amorphous silica is not less than 1 part by mass and not more than 8 parts by mass of the amorphous silica.

4. The insulated wire according to claim 1,
   wherein a content of the amorphous silica is not less than 3 parts by mass and not more than 7 parts by mass of the amorphous silica.

5. A cable, comprising:
   an insulated wire comprising a conductor and an insulation layer covering an outer periphery of the conductor; and
   a sheath formed around the insulated wire,
   wherein the sheath comprises a sheath halogen-free flame-retardant resin composition comprising a sheath base polymer, not less than 1 part by mass and not more than 10 parts by mass of an amorphous silica with a specific surface area of not less than 100 m$^2$/g and not more than 150 m$^2$/g, as measured by BET method and not less than 10 parts by mass and not more than 80 parts by mass of a metal hydroxide as a flame retardant component relative to 100 parts by mass of the sheath base polymer, and
   wherein the sheath base polymer consists of not less than 50 parts by mass and not more than 90 parts by mass of an ethylene-butene copolymer and not less than 10 parts by mass and not more than 50 parts by mass of a low-density polyethylene with a melting temperature of not less than 95° C. and not more than 101° C.,
   wherein the flame retardant component consists of the metal hydroxide.

6. The cable according to claim 5,
   wherein the insulation layer comprises an insulation layer halogen-free flame-retardant resin composition comprises an insulation layer base polymer, not less than 1 part by mass and not more than 10 parts by mass of an amorphous silica with a specific surface area of not less than 100 m$^2$/g and not more than 150 m$^2$/g, as measured by BET method and not less than 10 parts by mass and not more than 80 parts by mass of a halogen-free flame retardant relative to 100 parts by mass of the insulation layer base polymer, and wherein the insulation layer base polymer comprises not less than 50 parts by mass and not more than 90 parts by mass of an ethylene-butene copolymer and not less than 10 parts by mass and not more than 50 parts by mass of a low-density polyethylene.

7. The cable according to claim 5,
   wherein the sheath halogen-free flame-retardant resin composition further comprises not less than 1 part by mass and not more than 40 parts by mass of carbon black relative to 100 parts by mass of the sheath base polymer.

8. The cable according to claim 6,
   wherein the insulation layer halogen-free flame-retardant resin composition further comprises not less than 1 part by mass and not more than 40 parts by mass of carbon black relative to 100 parts by mass of the insulation layer base polymer.

9. The cable according to claim 5,
   wherein a content of the amorphous silica is not less than 1 part by mass and not more than 8 parts by mass of the amorphous silica.

10. The cable according to claim 5,
wherein a content of the amorphous silica is not less than 3 parts by mass and not more than 7 parts by mass of the amorphous silica.

* * * * *